United States Patent [19]

Allard

[11] Patent Number: 5,518,106

[45] Date of Patent: May 21, 1996

[54] APPARATUS FOR SEPARATING AND INDIVIDUALLY FEEDING BOARDS AND CANTS TO A PROCESSING UNIT

[75] Inventor: Benoit Allard, Chicoutimi-Nord, Canada

[73] Assignee: Les Ateliers Benoit Allard Inc., Quebec, Canada

[21] Appl. No.: 434,035

[22] Filed: May 2, 1995

[51] Int. Cl.⁶ .................................................. B65G 47/26
[52] U.S. Cl. ........................... 198/459.5; 198/463.5; 198/461.3
[58] Field of Search .................... 198/459.1, 459.2, 198/459.5, 459.6, 443, 444, 470.1, 476.1, 408, 461.3, 463.5

[56] References Cited

U.S. PATENT DOCUMENTS

| | | | |
|---|---|---|---|
| 2,679,919 | 6/1954 | De Koning | 198/459.5 |
| 3,019,882 | 2/1962 | Pearson | 198/459.2 |
| 3,757,927 | 9/1973 | Gable et al. | 198/463.5 |
| 4,077,524 | 3/1978 | Rysti | 198/459.1 |
| 4,869,360 | 9/1989 | Brown et al. | 198/459.6 X |
| 4,928,809 | 5/1990 | Bozza | 198/408 |
| 4,945,976 | 8/1990 | Ritola | 198/459.5 |

*Primary Examiner*—D. Glenn Dayoan
*Attorney, Agent, or Firm*—Dvorak and Traub

[57] ABSTRACT

The disclosure describes an apparatus, known in the lumber industry as a board or cant feeder, used to separate and move laterally, one by one, pieces of lumber having at least two parallel sawn or cut faces. These pieces are first brought side by side, in a single layer, to the apparatus by means of multiple carrying chains which move them transversally. They are then individually picked up on the upstream side of the apparatus by a grapple type mechanism mounted on a rotating element which delivers them singularly on its downstream side, by means of acceleration chains, to a group of receiving chains equipped with lugs, thus providing a controlled uniform feed to a lumber manufacturing process.

7 Claims, 6 Drawing Sheets

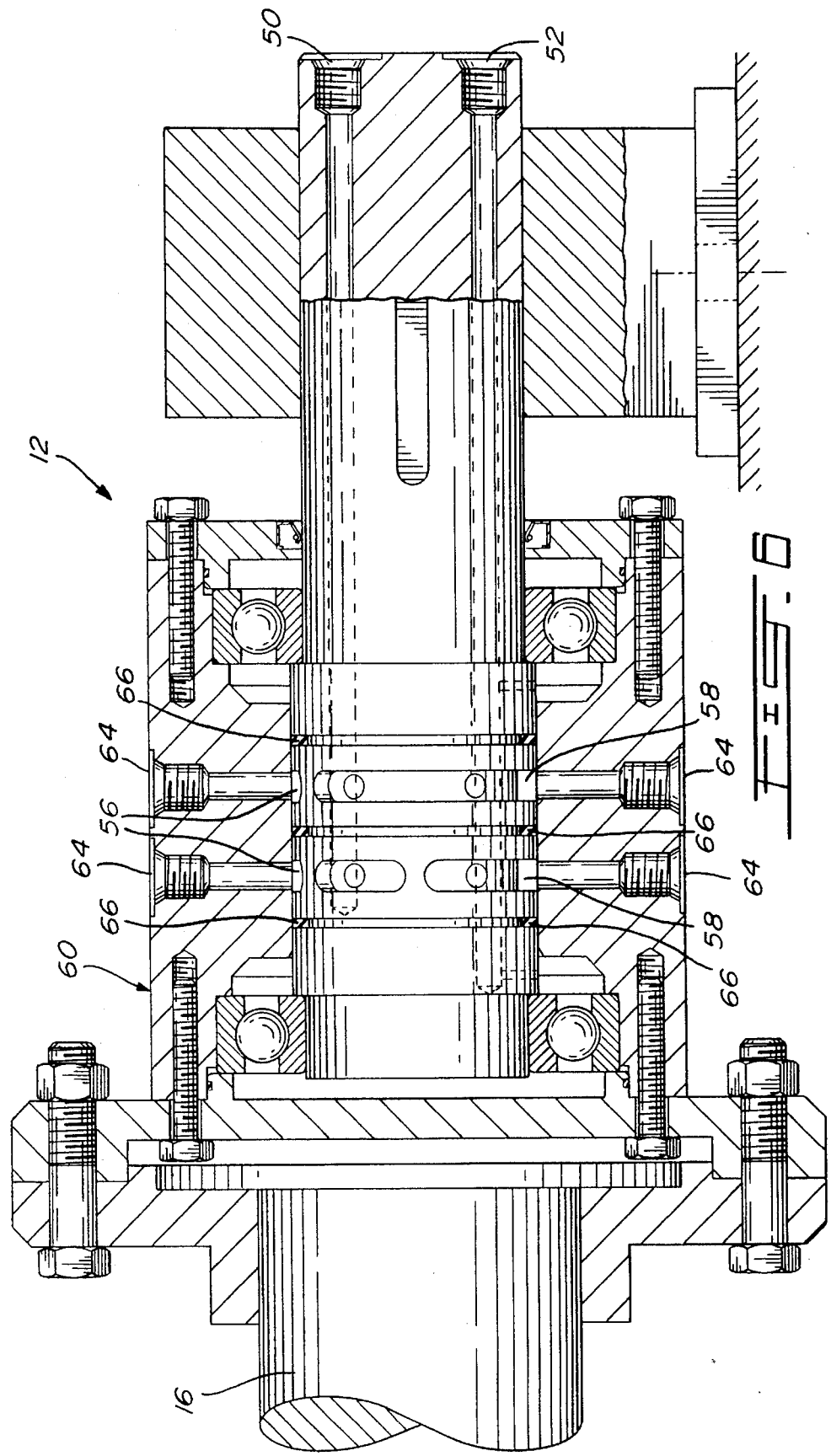

APPARATUS FOR SEPARATING AND INDIVIDUALLY FEEDING BOARDS AND CANTS TO A PROCESSING UNIT

FIELD OF THE INVENTION

The present invention relates to an apparatus to be used as a feeding system to a lumber processing unit, to provide a high piece count at an adjustable constant rate. The incoming material to be individually fed to the process consists of a continuous supply of boards and cants having at least two parallel faces. In the initial stage, these pieces are carried laterally in a single layer by several parallel chains towards the feeding device, the function of which is to pick out each piece from the incoming stream and to deposit them individually between rows of lugs on carry-off chains located downstream of the apparatus.

BACKGROUND OF THE INVENTION

A number of systems are presently found in the industry which generally fulfill the above described function. Among these are: inclined board elevators composed of parallel lugged chains and rejecting cam systems; large diameter rotating drums with external carrying lugs (both foregoing systems basically accomplish single layering of lumber pieces); cam or air actuated lift arm and feed wheel arrangements which, like the chain elevator and drum systems, are believed to have reached a performance ceiling of about 120 pieces per minute of rough sawn random sized lumber.

While the aforementioned feeding systems have held their place in the industry up to the present times, the need for much higher output is now being felt. In fact, resawing of small sized two-faced cants is commonly carried out at speeds of 400 to 500 FPM (in exceptional cases, feed rates through saws have reached 600 FPM), which leads to the need for cant feeding systems to supply some 60 pieces per minute in eight foot lengths and nearly double that amount in the newly developed four foot lumber market. Since the number of pieces produced in cant resawing is often more than twice that of the original cants, further stages of processing such as end trimming and sorting, require under such conditions, reliable feeding capacities well beyond 200 pieces per minute.

OBJECTS AND STATEMENT OF THE INVENTION

An object of the present invention is to overcome the above problems of presently used board and cant feeders by providing an apparatus which enables higher feed rates.

The present invention therefore relates to such apparatus which comprises:

a frame;

means for laterally advancing along the frame pieces of lumber side by side;

cam actuated restraining arms having a back and forth motion to control the advance of the lumber pieces;

a rotatable shaft mounted transversally to the frame and carrying rotating feed discs;

a number of loading stations mounted on the feed discs for receiving individual pieces of lumber on the upstream side thereof and for delivering them singularly on accelerating chains on the downstream side thereof; each loading station including (a) a receiving surface to support the lower face of a piece of lumber; (b) a rotatable hook means to contact the upper face of the piece of lumber; and (c) actuator means to cause the hook means to hold the piece of lumber while in transit between the loading position and the offloading position; and valve means mounted on the shaft, having outlet ports connected to the actuator means so as to provide hook actuation in synchronism with every phase of the loading and offloading cycles.

In one form of the invention, the valve means consist of a stationary distributing core connected to a hydraulic supply and a concentric portion keyed to the rotating feed disc shaft and provided with outlet ports statically connected to the actuator means.

In another form of the invention, the hydraulic valve controlling the loading and unloading motions of the hooks, could be actuated by external means originating from the main actuating shaft.

In a preferred form of the invention, an overriding control of the restraining arms is achieved through signals emitted by a rotating element mounted on the feed discs shaft to prevent lumber entry at inappropriate portions of the feed cycle, such as immediately following a feed interruption.

Other objects and further scope of applicability of the present invention will become apparent from the detailed description given hereinafter. It should be understood, however, that this detailed description, while indicating preferred embodiments of the invention, is given by way of illustration only, since various changes and modifications within the spirit and scope of the invention will become apparent to those skilled in the art.

BRIEF DESCRIPTION OF THE DRAWINGS

FIG. 6 is a cross-sectional view of the valve.

DESCRIPTION OF PREFERRED EMBODIMENT

Figure 1:
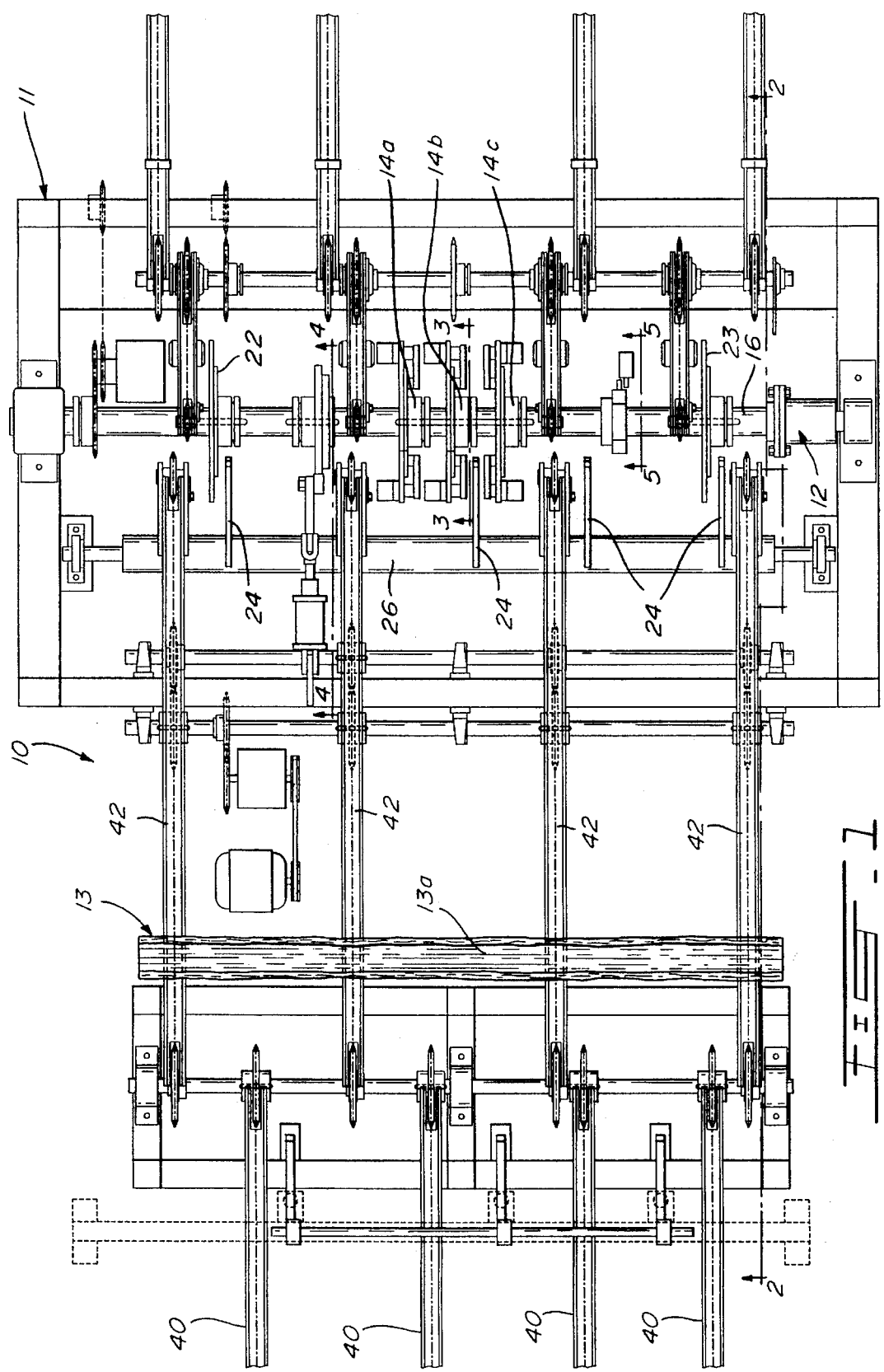
FIG. 1 is a top plan schematic view of the feeding apparatus of the present invention.
Figure 2:
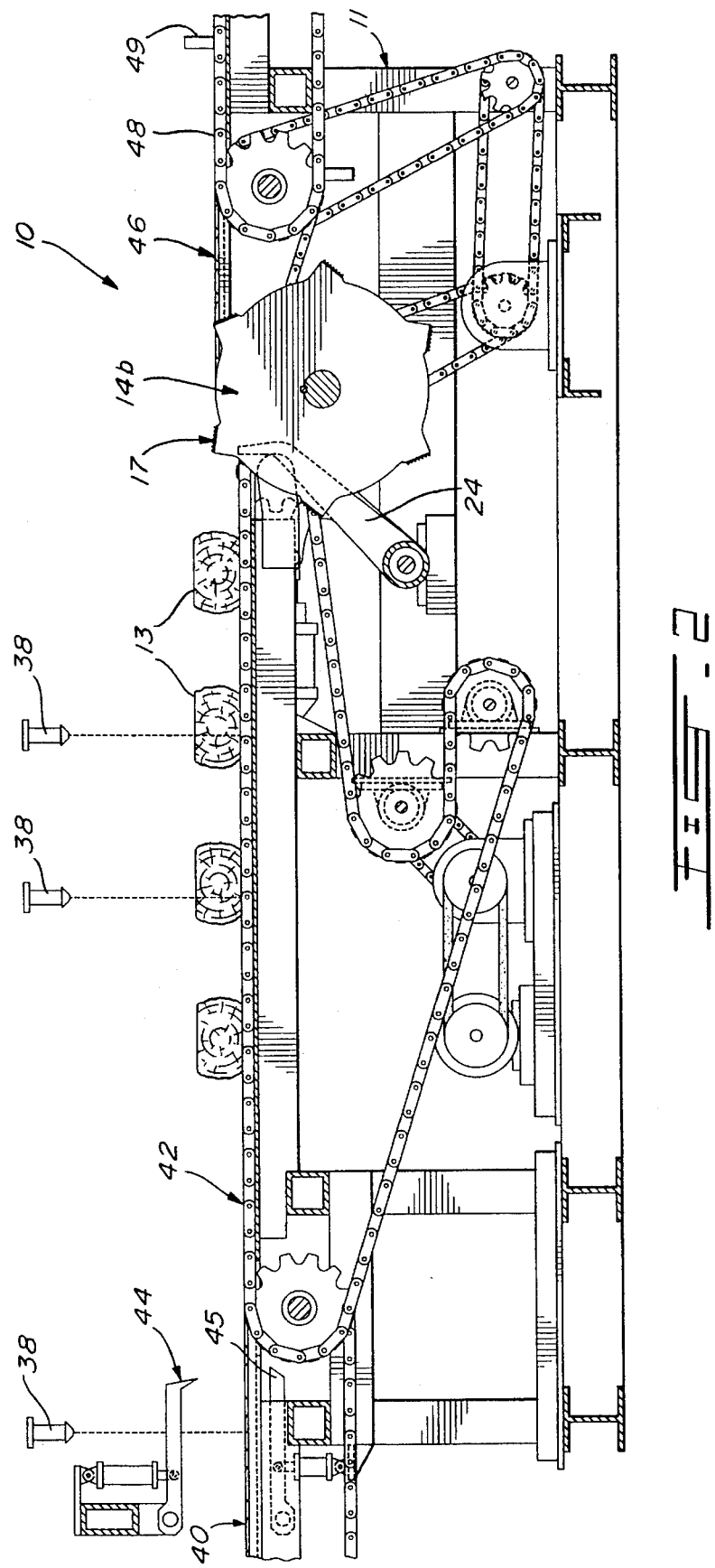
FIG. 2 is a schematic side elevation thereof.
Figure 3:
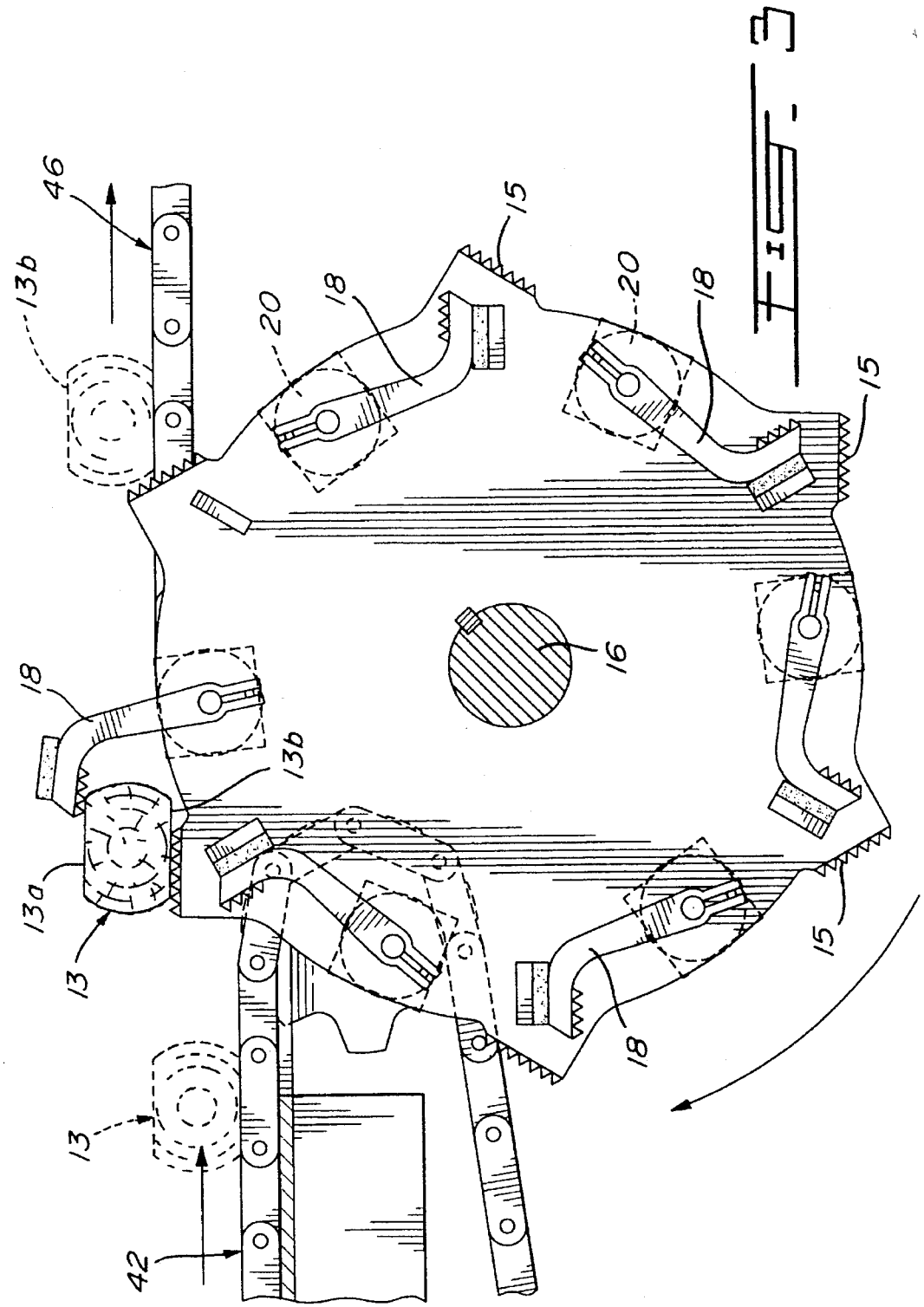
FIG. 3 is an enlarged cross-section taken along line 3—3 of FIG. 1.

As illustrated in FIGS. 1 and 2, the feeding apparatus of the present invention, generally designated 10, consists basically of a fixed supporting frame 11, a hydraulic rotary valve 12 controlling the main functions of the grappling and releasing of each incoming piece of lumber 13, one or more feeding discs (three of which being shown as 14a, 14b, 14c) mounted on a rotating shaft 16, on which are disposed a number of loading stations 17, each carrying a grapple type mechanism including a grappling hook 18 and a hook actuator 20 (see FIG. 3).

Figure 4:
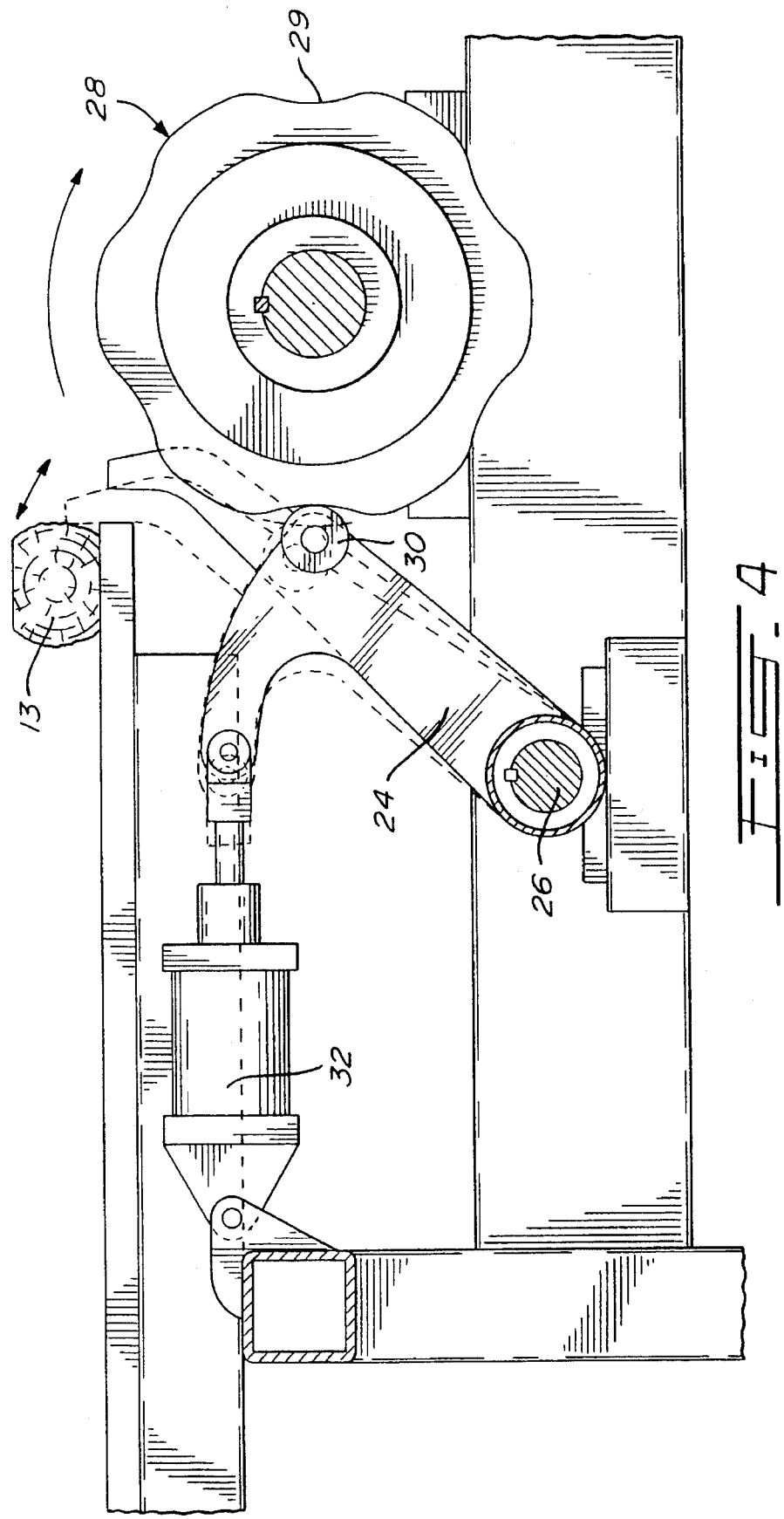
FIG. 4 is an enlarged cross-section taken along line 4—4 of FIG. 1.
Figure 5:
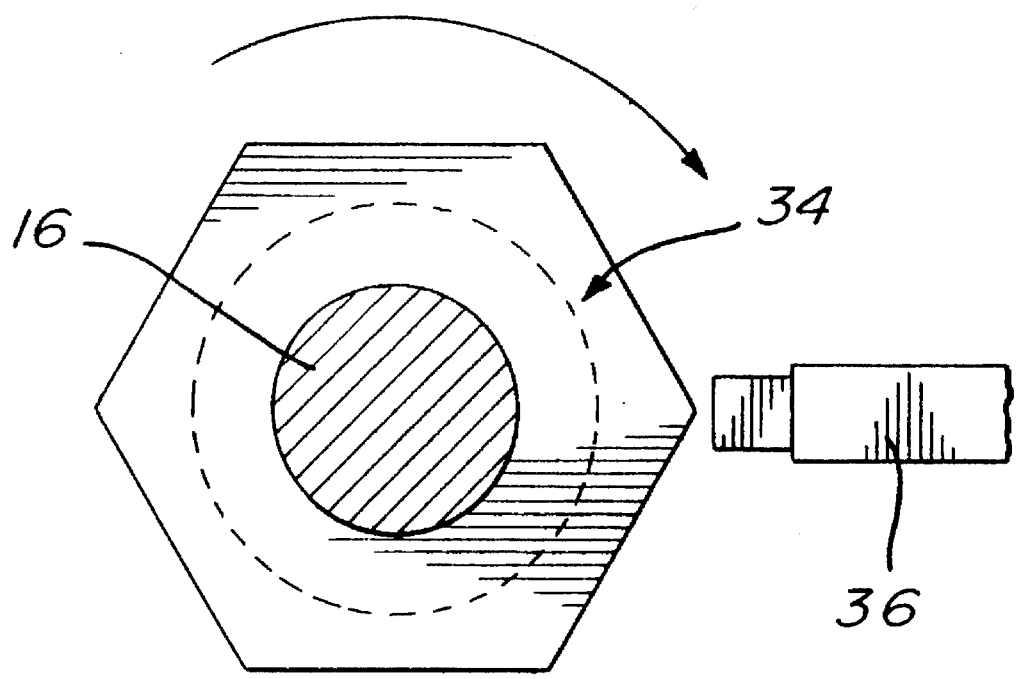
FIG. 5 is an enlarged cross-section taken along line 5—5 of FIG. 1.

Associated auxiliary components comprise: additional discs 22 and 23 mounted near the ends of the rotating shaft 16, but not provided with hooks and actuators, whose function is merely to support each piece of lumber along its length and mainly close to its extremities; lumber restraining arms 24 (see FIG. 4) mounted on a rocker shaft 26 and having a back and forth motion normally controlled by a rotating disc cam 28 in conjunction with a follower roller 30, both held in close contact by the forward force applied on the arm 24 through a pneumatic cylinder 32; a polygonal wheel 34 (see FIG. 5), mounted on rotating shaft 16, which causes signals to be emitted by a detecting element 36 to prevent access to a loading station in an unfavourable part of its cycle, for lumber previously held back by the combined action of the restraining arms 24 and the pneumatic cylinder 32; photoelectric cells 38 over the lumber approach decks 40 and 42, whose functions are:- a) to cut off lumber flow by causing a "pinch" type mechanism 44, 45 to be closed in case of oversupply, and:- b) to bunch up or straighten out the pieces by retracting the restraining arms 24 through the action of pneumatic cylinder 32 in cases of undersupply or of skewing of the incoming pieces. Transverse acceleration chains 46 followed by receiving chains 48 equipped with lugs 49 are provided downstream of the feeding apparatus to transfer the lumber pieces 13 individually to a manufacturing process.

Referring to FIGS. 1 to 5, the operating sequence throughout the system can be described as follows: each piece of lumber having opposite sawn or cut faces 13a, 13b moves crosswise in a single continuous layer on smooth parallel chains in transfer section 40. The pieces pass from section 40 to section 42 as long as load conditions on section 42 do not create undue pressure on the loading stations 17 of the feeding discs 20. Load conditions on section 40 are monitored by the photoelectric cells 38 which can actuate the pinching clamp 44, 45 in order to hold back or release the flow of lumber from section 40 to section 42. The timed positioning of each piece for loading upon the feeding discs is provided by the restraining arms 24 which are normally pushed forward by pneumatic pressure of cylinder 32 and into contact with the rotating cam disc 28 through the roller follower 30. In cases when lumber has been held back and is being released by the restraining arms 24, a further refinement of the lumber entry timing is ensured by signals generated by the polygonal disc 34 and detector 36 combination. At the earliest point of the loading cycle, the leading incoming piece is held back by the top extremity of the retaining arms 24 against the chain pull on the lumber, until follower roller 30 moves down the lobe profile 29 of cam 28 allowing the restraining arms to incline forward and release the piece to the grappling hook of the loading station. The piece is then pressed by the hook against a flat serrated pad 15 forming part of the feed disc 14, until released on the downstream side of the feed wheels by reverse hook motion (as shown in FIG. 3).

The timing for closing and subsequent opening of the grappling hook is tied to the rotational speed of the shaft and the angular position of the loading station in its circular travel. This is accomplished through the action of the rotary hydraulic valve 12, mounted on the shaft 16 of the feeding discs.

Upon the station reaching the discharge position, the grappling hook 18 opens to release the piece 13 to a set of accelerating chains 46 which move it forward at high speed unto chains 48, each piece 13 being accurately placed in the uniform space between the rows of lugs 49. Even though the disc and chain speeds are adjustable to establish the rate of feed, all mechanical elements of the system maintain speed synchronism by the use of positive interconnecting drives.

In order to attain a high piece count (such as 300/min.) in process feeding by rotating feeder, it is necessary to actuate a number of loading stations in each revolution of the discs. One solution is to utilize large diameter discs to accommodate as many such stations as necessary; however, this would lead to an increase in the dimensions of the associated components with an equivalent escalation of required working space and equipment costs. Larger diameter discs would also cause higher peripheral speeds and more severe impact on the pieces as they reach critical positioning at the loading stations. Instead, the present invention provides as a preferred alternative, for the purpose of high piece count loading, a number of smaller diameter discs 14 installed near the mid-point of the main rotating shaft 16 each carrying a convenient number of loading stations coming into receiving position at a constant rate so that, in each revolution of the discs and shaft assembly, a sufficient number of pieces are loaded into stations moving at a moderate speed, thus reducing the impact forces and the resulting chatter and bouncing of the pieces being loaded.

In order to preserve timing accuracy regardless of disc rotational speed, the rotary valve 12 which controls the opening and closing of the grappling hooks 18 through their actuator 20 as the stations move in and out of the loading zone, is mechanically tied to the disc mounting shaft 16. In a preferred mode of this invention, a part of the valve connected to a hydraulic supply (not shown) is anchored to a fixed base located at the extremity of the disc mounting shaft 16, while the other portion is keyed to said shaft and rotates around the fixed part. Hydraulic fluid leakage to the exterior is prevented by a sealing arrangement 66 (see FIG. 6) between the fixed and rotating parts. Alternative means of maintaining speed synchronism between the discs shaft and the rotating portion of the valve may include a mechanical drive from one to the other, such as a chain over sprockets, a gear train, etc. Such an alternative mode of mounting the hydraulic valve would however, complicate the hydraulic distribution circuit from valve to actuators, without providing offsetting benefits.

Referring to FIG. 6, the valve 12 operates in the following manner. Hydraulic fluid under pressure is supplied through inlet port 50 on the stationary part 54 of the valve. An exhaust port 52 is also provided in the same section of the valve. Hydraulic fluid under pressure is fed internally through the stationary valve core to groove porting 56 on its circumference. Complementary exhaust grooving 58 is also connected internally to external port 52. The rotating part 60 of the valve is keyed to the feeding disc rotating shaft 16. The rotating part of the valve is hydraulically connected through its external ports 64 through appropriate conduits (not shown) to the hydraulic actuators 20 of the grappling hooks 18. Rotation of the valve outer part 60 with the feeding discs 14 through their common mounting shaft 16 causes the outer ports 64 to become momentarily and successively connected to the pressure and exhaust chambers provided by the circumferential grooving 56, 58 on the stationary section 54 of the valve. Because of the synchronized alternance of pressure and exhaust conditions in the feed circuit to the actuators, the grappling hooks 18 on the feeding discs 14 open and shut alternatively in the proper sequence relative to the position of each loading station.

Although the invention has been described above with respect to a specific form, it will be evident to a person skilled in the art that it may be modified and refined in various ways. It is therefore wished to have it understood that the present invention should not be limited in scope, except by the terms of the following claims.

The embodiments of the invention in which an exclusive property or privilege is claimed are defined as follows:

1. In an apparatus for transversally feeding to a processing system, boards or cants one at a time and at a constant rate, said board or cants consisting of pieces of lumber having at least two parallel faces;

a frame;

means for laterally advancing along said frame pieces of lumber side by side;

cam actuated restraining arms having a back and forth motion to control the advance of lumber pieces;

a rotatable shaft mounted transversally to said frame and carrying rotating feed discs;

a number of loading stations mounted on said feeding discs for receiving individual pieces of lumber from an upstream side thereof and for delivering said individual pieces of lumber singularly to accelerating chains on a downstream side thereof; said loading stations each including (a) receiving means to contact a lower face of a piece of lumber; (b) actuatable hook means to contact an upper face of said piece of lumber; and (c) actuator means for operating said hook means to hold said pieces of lumber while moving from a loading position to an offloading position through rotation of said feed discs; and valve means associated with said shaft having outlet ports hydraulically connected to said actuator means to ensure synchronized hook actuation in every phase of loading and offloading.

2. In an apparatus as defined in claim 1, a control means including a cam wheel mounted on said rotatable shaft in contact with a roller follower to position a set of restraining arms pivotally mounted on a rocking shaft within said frame and controlling the forward flow of lumber towards the loading stations.

3. In an apparatus as defined in claim 2, a polygonal rotating disc and movement detector means to define cyclic periods of non-entry to said stations after interrupted operation and to override a normal positioning of said restraining arms.

4. In an apparatus as defined in claim 1, two or more parallel rotating discs having a shape similar to said feed discs and being hook free; said two or more parallel discs serving to support the pieces of lumber at extremities thereof.

5. In an apparatus as defined in claim 4, said valve means to consist of a rotary valve having a stationary distributing core connected to a hydraulic supply and having a concentric portion keyed to said rotating feed disc shaft; said outlet ports of said valve means being statically connected to said actuator means.

6. An apparatus for transversally feeding to a processing system boards or cants one at the time and at a constant piece rate, comprising:

a frame;

a rotatable shaft mounted transversally to said frame;

individual loading stations having a lower serrated edge and an upper mounted hook pivoted about an axis;

a hydraulic actuator causing said hook to pivot about said axis;

one or more parallelly mounted, circular rotating feed discs carrying a number of said loading stations;

two or more parallel rotating discs of similar shape to said feed discs but being hook free, and serving to support the lumber pieces at their extremities;

a rotating cam wheel mounted on said shaft in contact with a cam follower to position a set of restraining arms pivotally mounted on said frame and controlling forward flow of lumber towards the loading stations;

a polygonal rotating disc mounted on said shaft and movement detector means to define cyclic periods of no-entry to the loading stations after interrupted operation and to override the normal positioning of restraining arms associated with the cam wheel and the cam follower; and a rotary valve associated with said shaft having a stationary distributing core connected to a hydraulic supply and having a concentric portion keyed to said shaft; said valve having outlet ports statically connected to said actuator to insure synchronized hook motion in every phase of the loading and offloading.

7. An apparatus as defined in claim 6, further comprising accelerating chains receiving separated pieces of lumber conveyed after release from said hooks; said accelerating chains running at a speed determined to deposit each piece of lumber individually between rows of lugs on receiving chains located adjacent to said accelerating chains.

* * * * *